(12) United States Patent
Panesar et al.

(10) Patent No.: US 10,683,829 B2
(45) Date of Patent: Jun. 16, 2020

(54) GASEOUS FUEL INJECTORS

(71) Applicant: DELPHI TECHNOLOGIES IP LIMITED, St. Michael (BB)

(72) Inventors: Lukhbir Panesar, Feltham (GB); Malcolm Lambert, West Wickham (GB)

(73) Assignee: DELPHI TECHNOLOGIES IP LIMITED (BB)

( * ) Notice: Subject to any disclaimer, the term of this patent is extended or adjusted under 35 U.S.C. 154(b) by 0 days.

(21) Appl. No.: 15/780,378

(22) PCT Filed: Dec. 1, 2016

(86) PCT No.: PCT/EP2016/079452
§ 371 (c)(1),
(2) Date: May 31, 2018

(87) PCT Pub. No.: WO2017/093414
PCT Pub. Date: Jun. 8, 2017

(65) Prior Publication Data
US 2018/0363592 A1    Dec. 20, 2018

(30) Foreign Application Priority Data
Dec. 1, 2015 (GB) .................................. 1521184.0

(51) Int. Cl.
*F02M 21/02* (2006.01)
*F02P 13/00* (2006.01)
*F02P 15/00* (2006.01)
*H01T 13/00* (2006.01)
*H01T 13/40* (2006.01)

(52) U.S. Cl.
CPC ......... *F02M 21/0275* (2013.01); *F02P 13/00* (2013.01); *F02P 15/006* (2013.01); *F02M 21/0296* (2013.01); *H01T 13/00* (2013.01); *H01T 13/40* (2013.01); *Y02T 10/32* (2013.01)

(58) Field of Classification Search
CPC ..... F02M 21/0275; F02M 57/06; F02P 13/00; F02P 15/006
USPC ....................................................... 123/297
See application file for complete search history.

(56) References Cited

U.S. PATENT DOCUMENTS

| | | | | |
|---|---|---|---|---|
| 2,255,203 A | * | 9/1941 | Wiegand | ................ F02M 55/02 |
| | | | | 123/169 PH |
| 2,416,107 A | * | 2/1947 | Litton | ..................... H01T 13/39 |
| | | | | 165/185 |
| 2,459,286 A | * | 1/1949 | Wiegand | ................ F02M 57/06 |
| | | | | 137/542 |

(Continued)

FOREIGN PATENT DOCUMENTS

| | | |
|---|---|---|
| DE | 10231511 A1 | 1/2004 |
| DE | 102006029210 A1 * | 12/2007 ............. F02M 57/06 |

(Continued)

*Primary Examiner* — John M Zaleskas
(74) *Attorney, Agent, or Firm* — Joshua M. Haines

(57) ABSTRACT

A gaseous fuel injector for supplying gaseous fuel to a gaseous fuel combustion engine includes an injector housing which receives an injector assembly and supplies gaseous fuel thereto. The injector housing has an inlet at a first end, a nozzle with an outlet at a second open end and a chamber between the inlet and the outlet. The injector housing includes an ignition arrangement at the second open end.

4 Claims, 3 Drawing Sheets

(56) References Cited

U.S. PATENT DOCUMENTS

| | | | | |
|---|---|---|---|---|
| 2,586,864 A * | 2/1952 | Rose | | H01T 13/467 |
| | | | | 313/139 |
| 2,795,214 A * | 6/1957 | Shook, II | | F02M 51/04 |
| | | | | 123/297 |
| 2,899,585 A * | 8/1959 | Dollenberg | | H01T 13/52 |
| | | | | 313/130 |
| 3,926,169 A * | 12/1975 | Leshner | | F02B 17/005 |
| | | | | 123/297 |
| 4,095,580 A * | 6/1978 | Murray | | F02M 57/06 |
| | | | | 123/297 |
| 4,228,779 A | 10/1980 | Wetzel | | |
| 4,343,272 A * | 8/1982 | Buck | | F02B 7/06 |
| | | | | 123/143 R |
| 4,938,019 A * | 7/1990 | Angell | | F02P 21/04 |
| | | | | 60/39.827 |
| 4,967,708 A * | 11/1990 | Linder | | F02M 57/06 |
| | | | | 123/169 V |
| 4,982,708 A * | 1/1991 | Stutzenberger | | F02M 57/06 |
| | | | | 123/297 |
| 5,193,515 A | 3/1993 | Oota et al. | | |
| 5,497,744 A * | 3/1996 | Nagaosa | | F02M 51/005 |
| | | | | 123/297 |
| 5,715,788 A * | 2/1998 | Tarr | | F02M 57/06 |
| | | | | 123/297 |
| 5,983,855 A * | 11/1999 | Benedikt | | F02M 51/0671 |
| | | | | 123/297 |
| 6,135,084 A * | 10/2000 | Corneer | | F02M 57/06 |
| | | | | 123/259 |
| 6,155,212 A * | 12/2000 | McAlister | | F02B 43/08 |
| | | | | 123/25 B |
| 6,289,868 B1 * | 9/2001 | Jayne | | F02M 27/042 |
| | | | | 123/260 |
| 6,340,015 B1 * | 1/2002 | Benedikt | | F02M 61/166 |
| | | | | 123/297 |
| 6,446,597 B1 * | 9/2002 | McAlister | | F02B 3/06 |
| | | | | 123/296 |
| 6,955,154 B1 * | 10/2005 | Douglas | | F02M 57/06 |
| | | | | 123/297 |
| 7,121,270 B1 | 10/2006 | Plotnikov | | |
| 7,201,136 B2 | 4/2007 | McKay et al. | | |
| 7,628,137 B1 | 12/2009 | McAlister | | |
| 2002/0017271 A1 * | 2/2002 | Suckewer | | F02D 19/081 |
| | | | | 123/297 |
| 2003/0012985 A1 * | 1/2003 | McAlister | | F02B 3/06 |
| | | | | 204/242 |
| 2003/0111042 A1 * | 6/2003 | Rieger | | F02M 51/0671 |
| | | | | 123/297 |
| 2003/0168038 A1 * | 9/2003 | Leonard McKay | | |
| | | | | F02M 51/0671 |
| | | | | 123/297 |
| 2004/0149256 A1 * | 8/2004 | Dye | | F02M 27/04 |
| | | | | 123/297 |
| 2005/0045146 A1 * | 3/2005 | McKay | | F02M 51/0671 |
| | | | | 123/297 |
| 2005/0224043 A1 * | 10/2005 | Vogel | | F02M 57/06 |
| | | | | 123/297 |
| 2006/0169244 A1 * | 8/2006 | Allen | | F02D 35/021 |
| | | | | 123/297 |
| 2006/0260581 A1 * | 11/2006 | Yoshimoto | | F02B 17/005 |
| | | | | 123/143 B |
| 2007/0181110 A1 | 8/2007 | Toriyama et al. | | |
| 2007/0261397 A1 * | 11/2007 | Hirata | | B01D 53/90 |
| | | | | 60/299 |
| 2008/0072871 A1 * | 3/2008 | Vogel | | F02M 51/0671 |
| | | | | 123/297 |
| 2008/0098984 A1 * | 5/2008 | Sakamaki | | F02M 51/005 |
| | | | | 123/297 |
| 2010/0108023 A1 * | 5/2010 | McAlister | | F02M 51/0671 |
| | | | | 123/297 |
| 2010/0229827 A1 * | 9/2010 | Ehresman | | F02M 57/06 |
| | | | | 123/297 |
| 2011/0048381 A1 * | 3/2011 | McAlister | | F02M 51/0671 |
| | | | | 123/472 |
| 2011/0125391 A1 | 5/2011 | McAlister | | |
| 2011/0132319 A1 * | 6/2011 | McAlister | | F02M 57/06 |
| | | | | 123/297 |
| 2011/0233308 A1 * | 9/2011 | McAlister | | F02M 51/0671 |
| | | | | 239/533.2 |
| 2011/0297753 A1 * | 12/2011 | McAlister | | F02M 43/04 |
| | | | | 239/5 |
| 2012/0125287 A1 * | 5/2012 | Chiera | | F02B 19/12 |
| | | | | 123/254 |
| 2013/0047954 A1 * | 2/2013 | McAlister | | F02M 57/06 |
| | | | | 123/297 |
| 2013/0146027 A1 * | 6/2013 | Woo | | F02M 69/045 |
| | | | | 123/446 |
| 2013/0206122 A1 * | 8/2013 | Chiera | | H01T 13/54 |
| | | | | 123/594 |
| 2014/0090622 A1 * | 4/2014 | Seelig | | F02M 57/06 |
| | | | | 123/298 |
| 2014/0137840 A1 * | 5/2014 | McAlister | | F02M 57/06 |
| | | | | 123/445 |
| 2014/0245991 A1 * | 9/2014 | McAlister | | F02M 51/0603 |
| | | | | 123/297 |
| 2015/0037738 A1 * | 2/2015 | McAlister | | F02M 57/06 |
| | | | | 431/6 |
| 2017/0276110 A1 * | 9/2017 | Ikeda | | F02M 57/06 |

FOREIGN PATENT DOCUMENTS

| | | | | |
|---|---|---|---|---|
| EP | 1046814 A1 | 10/2000 | | |
| JP | 54017433 A | 2/1979 | | |
| NL | 1008870 C2 * | 10/1999 | | F02M 57/06 |
| WO | WO-2008017576 A1 * | 2/2008 | | F02M 51/0603 |
| WO | WO-2016027897 A1 * | 2/2016 | | F02M 57/06 |

* cited by examiner

GASEOUS FUEL INJECTORS

CROSS REFERENCE TO RELATED APPLICATIONS

This application is a national stage application under 35 USC 371 of PCT Application No. PCT/EP2016/079452 having an international filing date of Dec. 1, 2016, which is designated in the United States and which claimed the benefit of GB Patent Application No. 1521184.0 filed on Dec. 1, 2015, the entire disclosures of each are hereby incorporated by reference in their entirety.

BACKGROUND

Technical Field

The present invention relates generally to the field of gaseous fuel injectors. More particularly, but not exclusively, the present invention concerns an improved ignition arrangement for a gaseous fuel injector in a gaseous fuel combustion engine.

Description of the Related Art

Gaseous fuel combustion engines use a gaseous fuel such as Compressed Natural Gas (CNG) or Liquefied Natural Gas (LNG). These engines require a gaseous fuel injector to supply a calculated amount of the gas to the combustion chamber of an engine for ignition.

A gaseous fuel injector comprises a nozzle with a valve located at an outlet end. In known Spark Ignited Port Injected (SI-PI) gaseous fuel engines, gas is supplied into the inlet manifold and from there, valves control the flow of gas into the combustion chamber for ignition by an ignition source. This setup has typically been achieved by modifying an existing petrol engine, which has proven to be inefficient. The ignition source is usually a spark plug and is located usually to be serviceable and provide optimal engine geometry. However, such a location for the spark plug is generally inconvenient for gas ignition, thereby reducing the efficiency of combustion and increasing gaseous fuel consumption.

In dual fuel engines, it is known to use diesel as an ignition source for the gaseous fuel. In such engines, the general arrangement remains relatively unaltered except for the inclusion of a gas injection system. The existing diesel fuel injector works like a liquid spark plug to ignite a mixture of compressed gas and air in the combustion chamber. However, these conversions are costly.

The use of higher pressure gaseous fuels (e.g. up to 300 bar) has directed the development of High Pressure Direct Injection (HPDI) gaseous combustion engines towards the centrally-mounted injector to dispense the gas directly into the combustion chamber and the use of diesel as an ignition source. Whilst this has provided engines able to produce greater torque and power than the conventional SI-PI engines, to achieve this arrangement, a combined twin concentric diesel nozzle and gas nozzle is utilised. However, this arrangement is even more costly and complex than the above mentioned dual fuel engines.

It is an object of the present invention to address one or more of the problems of known arrangements, particularly for gaseous fuel combustion engines.

Therefore, it is now desired to provide an improved gaseous fuel injector that is capable of optimising gaseous fuel ignition. In particular, it is desired to provide a spark based ignition arrangement for a centrally-mounted high pressure Direct Injection-Natural Gas (DI-NG) fuel injector in a gaseous fuel combustion engine.

SUMMARY OF THE INVENTION

In a first aspect of the present invention there is provided a gaseous fuel injector for supplying gaseous fuel to a gaseous fuel combustion engine, the gaseous fuel injector comprising an injector housing adapted to receive an injector assembly and supply gaseous fuel thereto, the injector housing having an inlet at a first end, a nozzle with an outlet at a second open end and a chamber between the inlet and the outlet, characterised in that the injector housing comprises an ignition arrangement at the second open end.

With this gaseous fuel injector, the ignition arrangement is relocated from being mounted below the nozzle in the combustion chamber, to form an integral part of the gaseous fuel injector. The ignition spark can be located closer to the gaseous fuel being dispersed from a spray tip of an injector assembly mounted within the housing to increase the efficiency of combustion and decrease gaseous fuel consumption.

Preferably, the nozzle is adapted to comprise the ignition arrangement. Preferably, the nozzle comprises a primary electrode of the ignition arrangement.

By 'primary electrode' what is meant is an electrode that is adapted to conduct a high tension current from one end to another. The term 'nozzle' is intended to cover a body of the nozzle in addition to any other insulating and/or heat-shielding components.

By incorporating the primary electrode as part of the nozzle, the spark-producing part of the ignition arrangement can be ideally located very close to the gaseous fuel being dispersed from a spray tip of an injector assembly mounted within the housing.

Preferably, the nozzle comprises a nozzle body.

The nozzle may comprise an outer coating of a suitable electrical insulator material around the nozzle body. Preferably, the outer coating comprises an insulating ring around the nozzle body. Preferably, the insulating ring extends substantially along the entire length of the nozzle body.

Preferably, the nozzle comprises a heat shield or insulator. Preferably, the heat shield/insulator comprises a sleeve around the insulating ring. The heat shield/insulator sleeve may comprise a short cone section extending downwardly beyond the outlet at the second open end of the nozzle to define a small annular cavity just below the outlet. The short cone section may be configured to terminate just above spray apertures of the injector assembly.

The nozzle body may form the primary electrode by comprising a current conducting material. Alternatively, the nozzle may comprise a coating of current conducting material on an outer surface of the nozzle body.

Alternatively still, the heat shield/insulator sleeve may form the primary electrode by comprising a current conducting material. The heat shield/insulator sleeve may comprise an outer coating of a suitable electrical insulator material.

Preferably, the short cone section of the heat shield/insulator sleeve tapers into an annular pincer configuration.

The nozzle body may comprise a short cone section at the second open end. Preferably, the short cone section of the heat shield/insulator sleeve encompasses the short cone section of the nozzle body to form a minor annular space therebetween. Most preferably, the short cone section of the heat shield/insulator sleeve is configured to extend slightly below the short cone section of the nozzle body positioning minor annular space substantially around the spray apertures of the injector assembly.

The heat shield/insulator sleeve may comprise a leg extending downwardly from one side thereof. Preferably, the leg extends downwardly beyond the spray apertures of the injector assembly to define a space between a spray tip (comprising the spray apertures) of the injector assembly. Most preferably, the leg extends at least partially under the spray tip of the injector assembly. Preferably, the leg forms the primary electrode by comprising a current conducting material. The sleeve and the leg may both comprise a current conducting material.

The current conducting material may comprise copper, or any other suitable current conducting material.

Preferably, the current conducting material is connected to an insulated coaxial cable adapted to deliver a current thereto. Preferably, the coaxial cable enters the gaseous fuel injector through a drilling located in an upper portion of the injector housing. Preferably, the coaxial cable is connected to a power supply via a standard automotive electrical connector (not shown).

Preferably, the inlet is adapted to supply gaseous fuel to the injector assembly for receiving the gaseous fuel. Preferably, the gaseous fuel injector is adapted to be mounted in a cylinder head. Preferably, the gaseous fuel injector is adapted to be substantially centrally mounted on a combustion chamber of the engine.

In a second aspect of the present invention there is provided an ignition arrangement for a gaseous fuel injector, characterised in that the ignition arrangement forms part of the injector housing at a second open end thereof.

It will be appreciated that the preferred features described in relation to the first aspect of the invention also apply to the second aspect of the invention.

In a third aspect of the present invention there is provided gaseous fuel combustion engine comprising a gaseous fuel injector, the gaseous fuel injector comprising an injector housing adapted to receive an injector assembly and supply gaseous fuel to said engine, the injector housing having an inlet at a first end, a nozzle with an outlet at a second open end and a chamber between the inlet and the outlet, characterised in that the injector housing comprises an ignition arrangement at the second open end.

It will be appreciated that the preferred features described in relation to the first aspect and the second aspect of the invention also apply to the third aspect of the invention.

BRIEF DESCRIPTION OF THE DRAWINGS

For a better understanding of the invention, and to show how exemplary embodiments may be carried into effect, reference will now be made to the accompanying drawings in which.

DETAILED DESCRIPTION OF THE EXEMPLARY EMBODIMENTS

Figure 1:
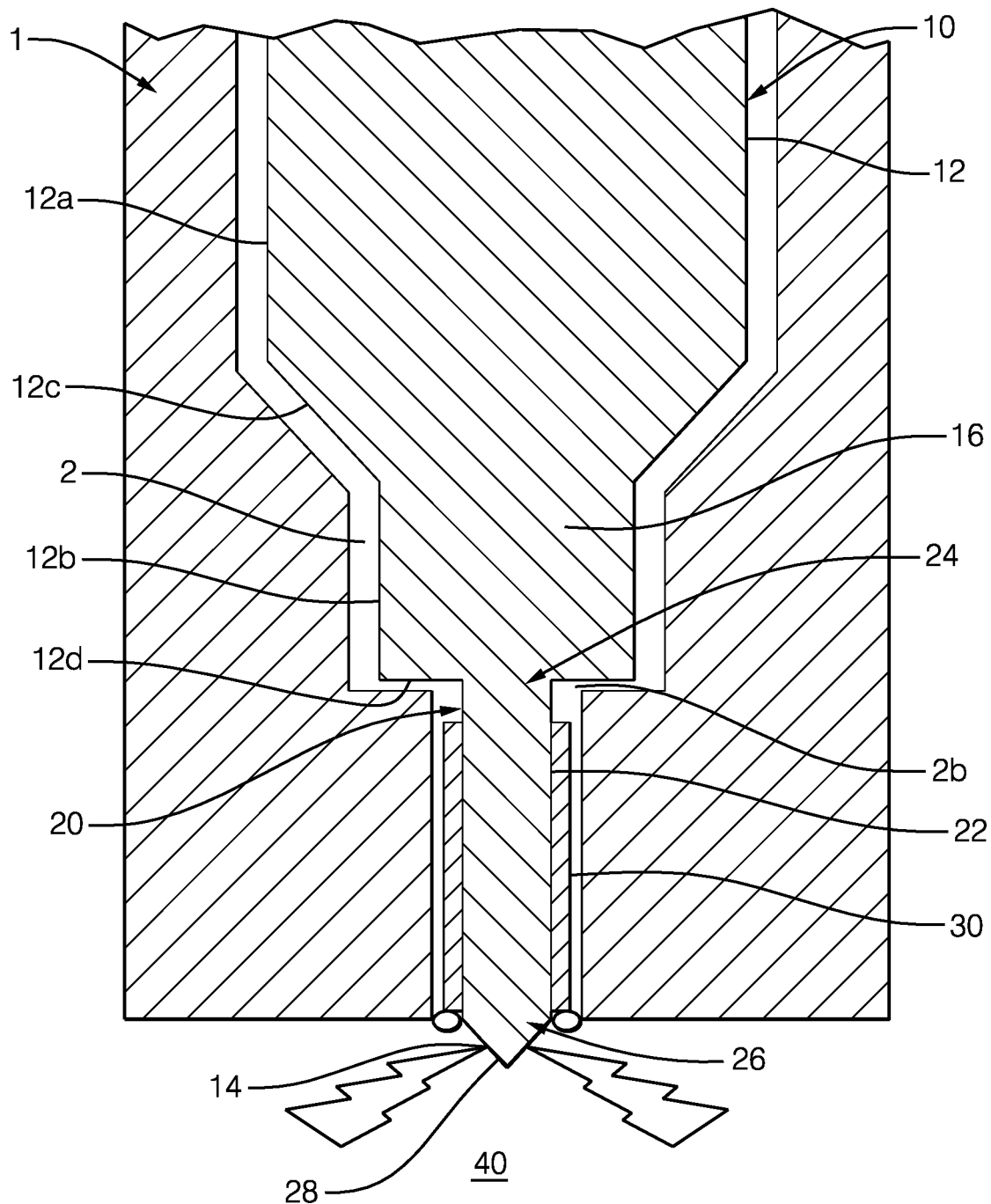
FIG. 1 is a schematic cross-sectional side view of a gaseous fuel injector according to a first embodiment of the invention.

As shown in the Figures, the invention comprises a gaseous fuel injector 10 for supplying gaseous fuel to a gaseous fuel combustion engine (not shown). The gaseous fuel injector 10 comprises an injector housing 12 adapted to receive an injector assembly (not specifically shown) and supply gaseous fuel thereto, the injector housing 12 having an inlet (not shown) at a first end, a nozzle 20, 20' with an outlet 14 at a second open end and a chamber 16 between the inlet and the outlet 14, characterised in that the injector housing 12 comprises an ignition arrangement at the second open end.

Figure 2:
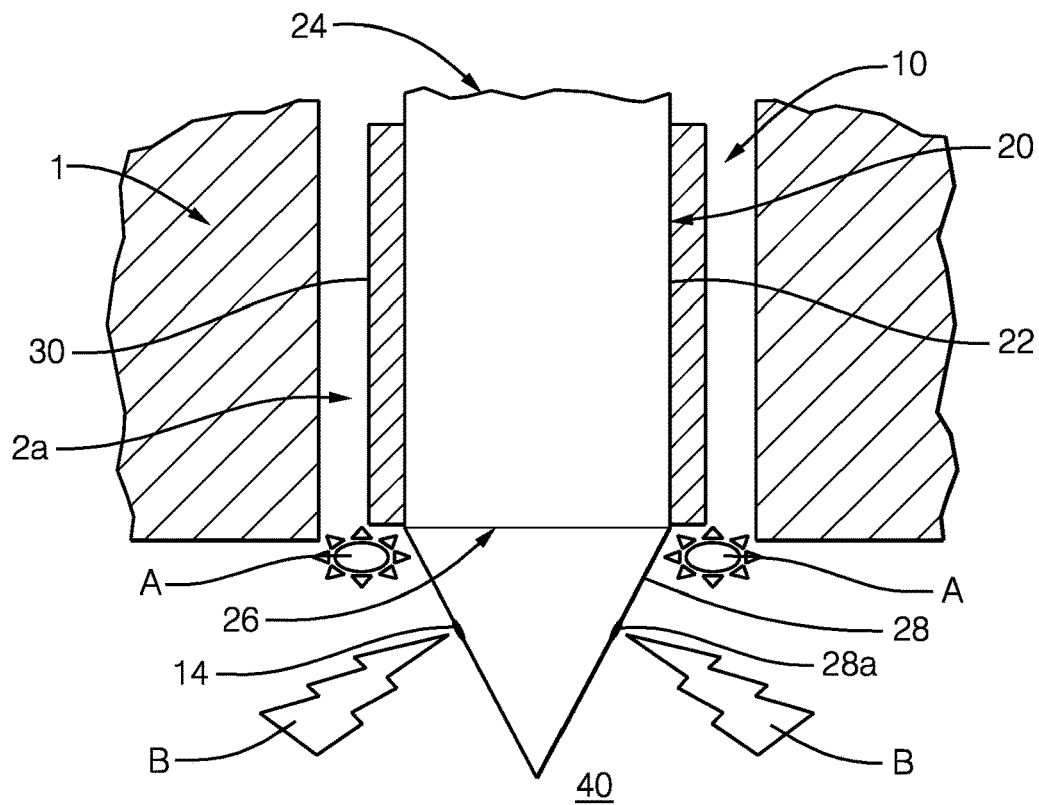
FIG. 2 is an enlarged schematic cross-sectional side view of a nozzle of the gaseous fuel injector of FIG. 1.

A first embodiment of the invention is shown in FIGS. 1 and 2.

As can be seen more clearly in FIG. 2, the nozzle 20 comprises a main nozzle body 22 as part of the housing 12, which is a substantially elongate hollow cylindrical body part. The nozzle 20 comprises a first open end 24 communicating with the chamber 16 of the gaseous fuel injector 10. A second open end 26 of the nozzle 20 provides the outlet 14 which is adapted to receive a spray tip 28 of the injector assembly therethrough for presentation into a combustion chamber 40.

The main nozzle body 22 of the nozzle 20 comprises a current conducting material, such as copper. However, it is to be appreciated that an outer surface of the main nozzle body 22 of the nozzle 20 may simply be coated with suitable a current conducting material.

The nozzle 20 is connected to an insulated coaxial cable (not shown) adapted to deliver a current to the nozzle 20 in order to transform the main nozzle body 22 into a primary electrode as part of the ignition arrangement. The coaxial cable enters the gaseous fuel injector 10 through a drilling located in an upper portion 12a of the injector housing 12. The coaxial cable is connected to a power supply via a standard automotive electrical connector (not shown).

The main nozzle body 22 of the nozzle 20 comprises an outer coating of a suitable electrical insulator material, such as a ceramic, or other suitable insulator such as Polytetrafluoroethylene (PTFE), to form an insulating ring 30 therearound. The insulating ring 30 extends substantially from just below the first open end 24 and terminates substantially at the second open end 26.

The injector housing 12 comprises the upper portion 12a, which narrows to a middle section 12b via a sloped stepped section 12c. The middle section 12b further narrows to the nozzle 20 via a planar stepped section 12d.

The cylinder head 1 into which the gaseous fuel injector 10 is mounted provides a shaped cavity 2 to mirror that of the injector housing 12. The cavity 2 provides a seat 2b for the planar stepped section 12d of the housing 12 in the form of an annular ledge. The cavity 2 provides an annular cavity 2a around the insulating ring 30 of the nozzle 20.

In use, as the injector assembly is operated to dispense gaseous fuel jets B from apertures 28a in the injector spray tip 28, a current is supplied to the main nozzle body 22 of the nozzle 20 turning the main nozzle body 22 into the primary electrode. The cylinder head 1, typically comprising steel, functions as the secondary electrode. The insulating ring 30 prevents the primary electrode from ionising gas in the cavity 2a except for at the second open end 26 of the nozzle body 22, where the primary electrode is not insulated. At this location, the primary electrode is able to ionise surrounding gases, which creates a conductor within the cavity 2a between the primary electrode and the cylinder head 1 and generates a spark A around the cavity 2a at the second open end 26. Since the spark A is above and proximal to the jets of gaseous fuel B being expelled from the injector spray tip 28, an improved rate of ignition of the gaseous fuel is achieved in the combustion chamber 40.

Figure 3:
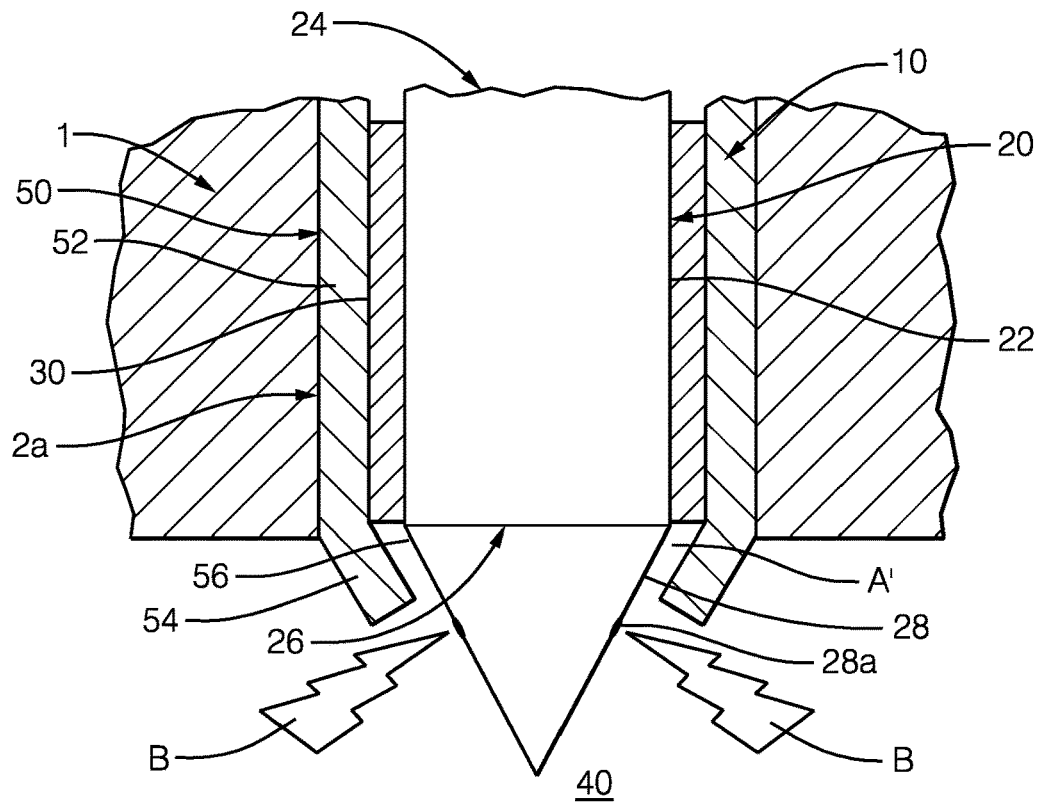
FIG. 3 is an enlarged schematic cross-sectional side view of a nozzle of a gaseous fuel injector according to a second embodiment of the invention.

FIG. 3 shows a second embodiment of the invention.

In this case, the nozzle 20 also comprises a heat shield in the form of a sleeve 50 around the insulating ring 30 comprising copper. The sleeve 50 comprises a hollow cylindrical main body 52 that surrounds the insulating ring 30 followed by a short cone section 54. The short cone section 54 extends the sleeve 50 downwardly beyond the second open end 26 of the main nozzle body 22 and insulating ring 30 to form a small annular cavity 56 around an upper part of the injector spray tip 28. The short cone section 54 terminates just above the apertures 28a supplying the jets of gaseous fuel B from the injector spray tip 28. Whereas before, the main nozzle body 22 of the nozzle 20 comprised a current conducting material, in this embodiment, the sleeve 50 comprises the current conducting material comprising copper as previously described. The sleeve 50 is connected to a coaxial cable delivering a current (not shown) in order to transform the sleeve 50 into the primary electrode. The nozzle 20 comprises a coating of a suitable electrical insulator material around the main nozzle body 22 to form an insulating ring 30 therearound, as before. The sleeve 50 also comprises a coating of a suitable electrical insulator material.

In use, as the injector assembly is operated to dispense gaseous fuel from the apertures 28a, a current is supplied to the sleeve 50 of the nozzle 20 turning the sleeve 50 into the primary electrode. An uninsulated end of the nozzle body 22, typically comprising steel, functions like a secondary electrode and as the sleeve 50 focuses the ionisation of gas within the small annular cavity 56, a spark A' jumps across to the nozzle body 22 within and around the small annular cavity 56. Since the spark A' is generated and directed very close to the jets of gaseous fuel B being expelled from the injector spray tip 28, an effective rate of ignition of the gaseous fuel is achieved in the combustion chamber 40.

Figure 4:
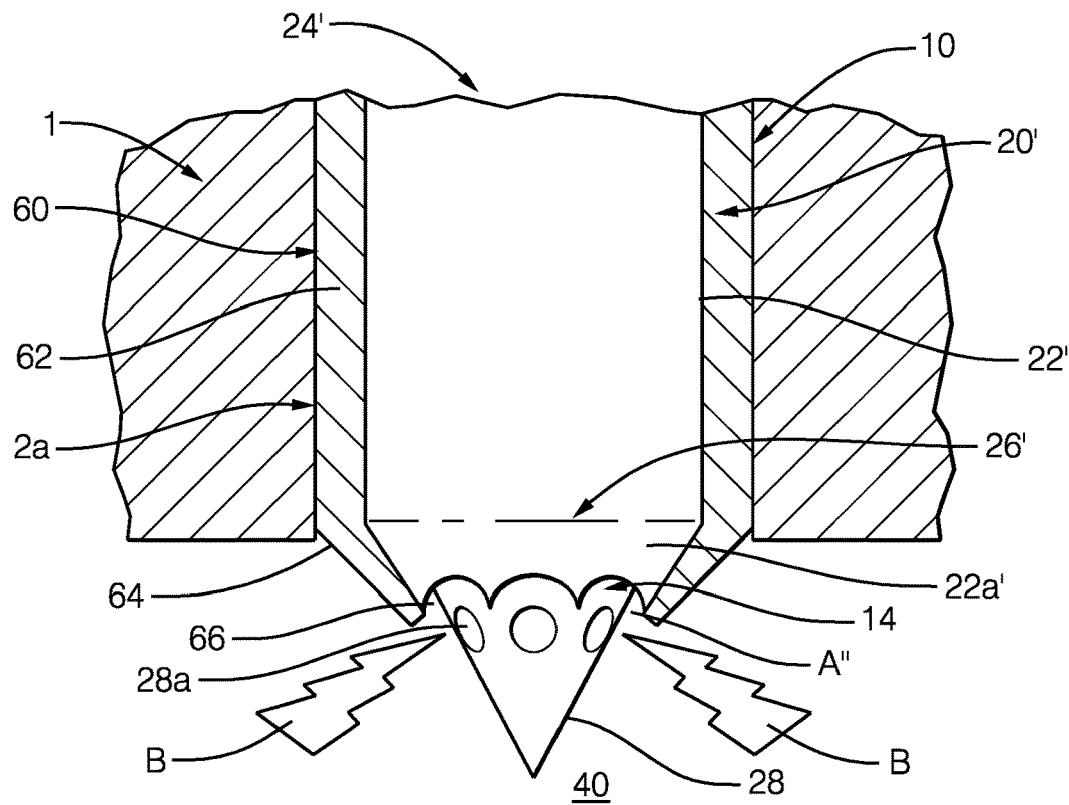
FIG. 4 is an enlarged schematic cross-sectional side view of a nozzle of a gaseous fuel injector according to a third embodiment of the invention.

FIG. 4 shows a third embodiment of the invention.

As in the second embodiment, the nozzle 20' comprises a heat shield sleeve 60 comprising a cylindrical main body 62 that surrounds the main nozzle body 22 followed by a short cone section 64 similarly to FIG. 3. In this case, the short cone section 64 of the sleeve 60 tapers into an annular pincer configuration. Again, the sleeve 60 comprises a current conducting material, such as copper. The sleeve 60 is connected to a coaxial cable delivering a current (not shown) in order to transform the sleeve 60 into the primary electrode. In this case, the cylindrical main nozzle body 22' of the nozzle 20' is extended around an upper part of the injector spray tip 28 with a short cone section 22a' such that the second open end 26/outlet 14 is provided just above the apertures 28a where the jets of gaseous fuel B are expelled from the injector spray tip 28. The short cone section 64 of the sleeve 60 encompasses the short cone section 22a' of the nozzle body 22' and extends slightly below the second open end 26 creating a minor annular space 66 around the injector spray tip 28 adjacent the apertures 28a for the jets B.

In use, as the injector assembly is operated to dispense gaseous fuel from the apertures 28a, a current is supplied to the sleeve 60 turning the sleeve 60 into the primary electrode. The short cone section 22a' of the nozzle body 22', typically comprising steel, functions like a secondary electrode and as the sleeve 60 focuses the ionisation of gas within the space 66 where the primary electrode is exposed, a spark A" jumps across to the short cone section 22a' of the nozzle body 22' in the space 66. Since the spark A" is generated and directed adjacent to the apertures 28a and as such, the jets of gaseous fuel B being expelled from the injector spray tip 28, an excellent rate of ignition of the gaseous fuel is achieved in the combustion chamber 40.

Figure 5:
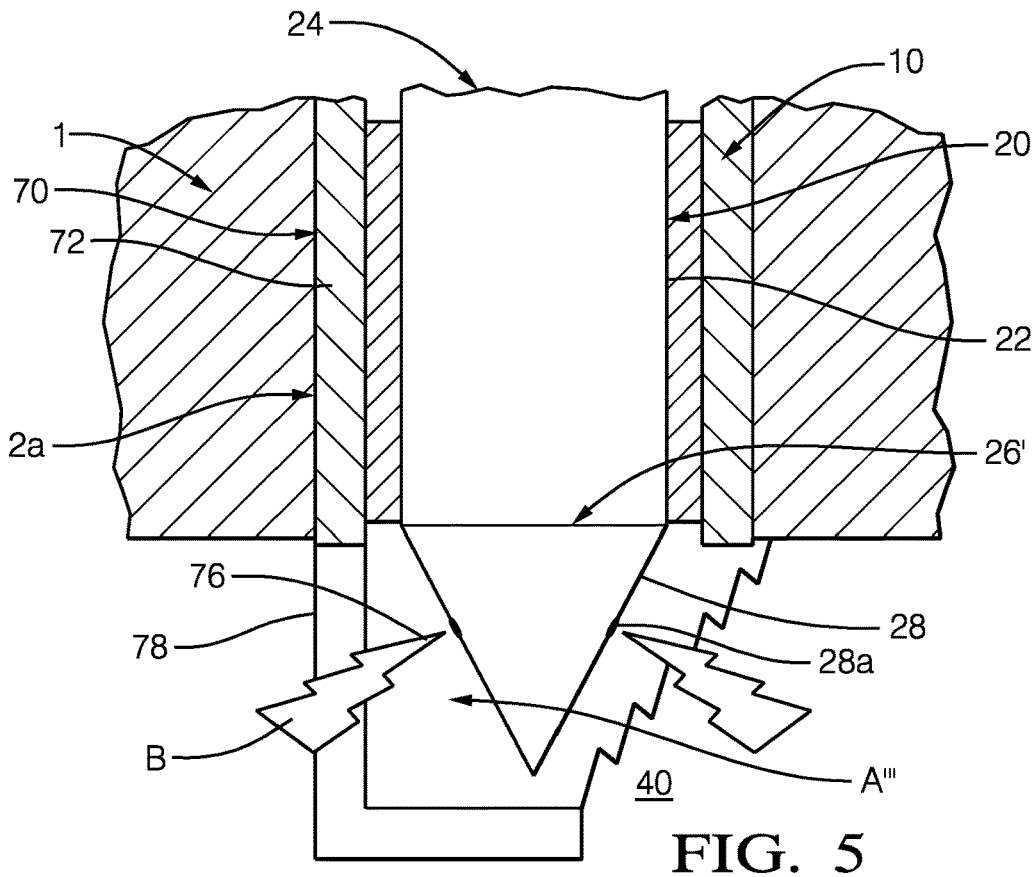
FIG. 5 is an enlarged schematic cross-sectional side view of a nozzle of a gaseous fuel injector according to a fourth embodiment of the invention.

Finally, FIG. 5 shows a fourth embodiment of the invention.

The nozzle 20 is configured as described in the first and second embodiments with an insulating ring 30. Again, the nozzle 20 comprises a heat shield sleeve 70 comprising a cylindrical body 72 that surrounds the insulating ring 30. The sleeve 70 comprises an insulator coating. In this case, a leg 78 extends downwardly from one side of the sleeve 70 and passes under the injector spray tip 28. The sleeve 70 and the leg 78 both comprise a current conducting material, such as copper, in order to transform the leg 78 into a primary electrode. In use, as the injector assembly is operated to dispense gaseous fuel from the apertures 28a, a current is supplied to the leg 78 via a coaxial cable attached to the sleeve 70 as previously described. The leg 78 focuses the ionisation of gas within a space 76 between the leg 78 and the nozzle body 22 passing the injector spray tip 28 to generate a spark A'" in the space 76. Since the spark A'" passes through the jets of gaseous fuel B as it jumps across the space 76 to the nozzle body 22, optimal rates of ignition of the gaseous fuel is achieved in the combustion chamber 40.

With the embodiments described above, gaseous fuel ignition is greatly improved and difficulties with mounting a conventional spark plug in a combustion chamber are circumvented.

Although the above embodiments are shown and have been described in relation to a gaseous fuel combustion engine, it is to be appreciated that the invention may be applied to other fuel consuming devices.

Although a few preferred embodiments have been shown and described, it will be appreciated by those skilled in the art that various changes and modifications might be made without departing from the scope of the invention, as defined in the appended claims.

The invention claimed is:

1. A gaseous fuel injector for supplying gaseous fuel to a gaseous fuel combustion engine, the gaseous fuel injector comprising:
   an injector housing adapted to receive an injector assembly and supply the gaseous fuel thereto, the injector housing having a nozzle body, an inlet at a first end, a nozzle with spray apertures at a second open end, a chamber between the inlet and the spray apertures, and an ignition arrangement at the second open end;
   wherein the nozzle is adapted to comprise the ignition arrangement comprising a primary electrode thereof;
   wherein the nozzle comprises an outer coating of an electrical insulator material forming an insulating ring around the nozzle body along a length of the nozzle body;
   wherein the nozzle comprises a heat shield comprising a sleeve around the insulating ring; and
   wherein the sleeve of the heat shield comprises a short cone section extending downwardly at the second open end of the nozzle to define a small annular cavity terminating below the insulating ring and just above the spray apertures, wherein a lower-most end of the short cone section has an inner periphery which terminates just above the spray apertures.

2. The gaseous fuel injector according to claim 1, wherein the sleeve of the heat shield forms the primary electrode by comprising a current conducting material.

3. The gaseous fuel injector according to claim 1, wherein the nozzle body forms the primary electrode by comprising a current conducting material.

4. The gaseous fuel injector according to claim 3, wherein the current conducting material comprises copper and is connected to an insulated coaxial cable adapted to deliver a current thereto.

* * * * *